US012729132B2

(12) United States Patent
Kodama

(10) Patent No.: US 12,729,132 B2
(45) Date of Patent: Sep. 8, 2026

(54) ZIRCONIUM COMPOSITE OXIDE AND METHOD FOR PRODUCING ZIRCONIUM COMPOSITE OXIDE

(71) Applicant: DAIICHI KIGENSO KAGAKU KOGYO CO., LTD., Osaka (JP)

(72) Inventor: Hiroshi Kodama, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 378 days.

(21) Appl. No.: 18/566,437

(22) PCT Filed: Jul. 26, 2022

(86) PCT No.: PCT/JP2022/028719
§ 371 (c)(1),
(2) Date: Dec. 1, 2023

(87) PCT Pub. No.: WO2023/008408
PCT Pub. Date: Feb. 2, 2023

(65) Prior Publication Data

US 2024/0254002 A1 Aug. 1, 2024

(30) Foreign Application Priority Data

Jul. 28, 2021 (JP) ................................ 2021-122960

(51) Int. Cl.
*C01G 25/00* (2006.01)

(52) U.S. Cl.
CPC ........ *C01G 25/006* (2013.01); *C01P 2006/12* (2013.01); *C01P 2006/14* (2013.01); *C01P 2006/80* (2013.01)

(58) Field of Classification Search
CPC ................................ C01G 25/006; B01J 23/10
See application file for complete search history.

(56) References Cited

U.S. PATENT DOCUMENTS 7,919,429 B2 * 4/2011 Okamoto ............. C01G 25/006 502/349
2008/0090723 A1 4/2008 Okamoto et al.
2009/0274599 A1 11/2009 Larcher et al.
2010/0040523 A1 2/2010 Larcher et al.
2011/0206583 A1 8/2011 Larcher et al.
2018/0282225 A1 10/2018 Takai
2019/0134608 A1 5/2019 Ifrah et al.
2022/0177372 A1 6/2022 Matsumoto et al.
2022/0212999 A1 7/2022 Matsui et al.
2023/0321631 A1 * 10/2023 Zhang ...................... B01J 23/10 502/304

FOREIGN PATENT DOCUMENTS

CN 101406829 A 4/2009
CN 103191711 A 7/2013
CN 103191712 A 7/2013
CN 104659397 A 5/2015
CN 110252276 A 9/2019
EP 1 921 044 A2 5/2008
EP 2024084 B1 7/2019
JP 2007-332026 A 12/2007
JP 2008-115070 A 5/2008
JP 2009-526729 A 7/2009
JP 2011-520745 A 7/2011
JP 2017-532278 A 11/2017
JP 2019-518693 A 7/2019
WO 2016/037059 A1 3/2016
WO 2017/072509 A1 5/2017
WO 2017/170565 A1 10/2017
WO 2017/185224 A1 11/2017
WO 2020/217942 A1 10/2020
WO 2021/020104 A1 2/2021

OTHER PUBLICATIONS

Extended European Search Report issued in EP 22 84 9469.6-1014 by the European Patent Office on Jul. 2, 2025, which is related to U.S. Appl. No. 18/566,437.
An Office Action mailed by China National Intellectual Property Administration on Dec. 16, 2025, which corresponds to Chinese Patent Application No. 202280050722.0 and is related to U.S. Appl. No. 18/566,437; with English language translation.
International Search Report issued in PCT/JP2022/028719; mailed Oct. 4, 2022.
"Notice of Reasons for Refusal" Office Action issued in JP 2021-122960; mailed by the Japanese Patent Office on Oct. 12, 2021.
An Office Action mailed by China National Intellectual Property Administration on May 26, 2026, which corresponds to Chinese U.S. Appl. No. 18/566,437.0 and is related to U.S. Appl. No. 18/566,437; with English language translation.

* cited by examiner

*Primary Examiner* — Richard M Rump
(74) *Attorney, Agent, or Firm* — Studebaker Brackett PLLC

(57) ABSTRACT

Provided is a zirconium composite oxide containing 5 mass % to 50 mass % yttrium oxide and cerium oxide, the specific surface area after 10 hours of heating at 1250° C. being 3.0 $m^2/g$ to 20.0 $m^2/g$.

14 Claims, No Drawings

ZIRCONIUM COMPOSITE OXIDE AND METHOD FOR PRODUCING ZIRCONIUM COMPOSITE OXIDE

TECHNICAL FIELD

The present invention relates to a zirconium composite oxide and a method for producing a zirconium composite oxide.

BACKGROUND ART

Conventionally, there has been a strong demand for improvement in fuel efficiency of automobiles in order to reduce $CO_2$ emissions. On the other hand, in engine control of an automobile, excessive injection of fuel called rich spike is performed in order to maximize the purification performance of a catalyst.

Patent Document 1 discloses a composition comprising zirconium oxide and cerium oxide, wherein the composition has an apparent surface area after heating at 1200° C. for 10 hours or more of about 1.0 to about 6.0 $m^2/g$ (see especially claim 1).

Patent Document 2 discloses a composition consisting of a mixture of four oxides of zirconium, cerium, lanthanum, and a rare earth element which is either yttrium, samarium or gadolinium, wherein the composition has a specific surface area after heating at 1200° C. for 10 hours of 7 $m^2/g$ or more and 12 $m^2/g$ or less (see, in particular, claim 1 and Examples).

Patent Document 3 discloses a composition based on a zirconium oxide, a cerium oxide, and an yttrium oxide, wherein the composition has a specific surface area after calcination at 1150° C. for 10 hours of at least 15 $m^2/g$ (see, especially, claim 1), and has a specific surface area after heating at 1200° C. for 10 hours of 12 $m^2/g$ or less (see, especially, Examples).

Patent Document 4 discloses a composition comprising zirconium, cerium, and lanthanum, wherein the composition has a specific surface area after heating at 1100° C. for 4 hours in air of 35 to 50 $m^2/g$ (see, especially, claim 1).

PRIOR ART DOCUMENTS

Patent Documents

Patent Document 1: JP-A-2017-532278
Patent Document 2: European Patent No. 2024084
Patent Document 3: JP-A-2009-526729
Patent Document 4: US 2019/0134608 A

SUMMARY OF THE INVENTION

Problems to be Solved by the Invention

The rich spike excessively supplies fuel, and thus causes the deterioration of fuel efficiency. Therefore, in the future, in vehicle development focusing on reduction of $CO_2$ emission, engine control with less rich spike is considered to be the mainstream.

When the rich spike is reduced, a catalyst and a carrier thereof are to be exposed to a higher temperature. That is, a heat load on the catalyst and the carrier is increased. When the heat load increases, the carrier of the catalyst is sintered. Sintering of the carrier invites decrease in the specific surface area of the carrier. The decrease in the specific surface area of the carrier invites sintering of the supported noble metal (catalyst). When the noble metal is sintered, the catalytic activity decreases and the exhaust gas purification performance of the catalyst decreases.

Conventionally, it has been sufficient that a catalyst to be used in the control in which rich spike is introduced can withstand a heat load of 1100° C., but in the control in which rich spike is reduced, it is considered that a catalyst is required to have a high specific surface area even after being exposed to a high temperature exceeding 1200° C.

The present invention has been devised in view of the above-described problems, and an object of the present invention is to provide a zirconium composite oxide which can maintain a high specific surface area even through exposure to a high temperature exceeding 1200° C. Another object of the present invention is to provide a method for producing the zirconium composite oxide.

Means for Solving the Problems

The present inventors have intensively studied a zirconium composite oxide. As a result, the present inventors have found that the above problems can be solved by employing the following configuration, and have accomplished the present invention.

That is, the zirconium composite oxide according to the present invention comprises:

5% by mass or more and 50% by mass or less of yttrium oxide; and cerium oxide, wherein the zirconium composite oxide has a specific surface area after heating at 1250° C. for 10 hours is 3.0 $m^2/g$ or more and 20.0 $m^2/g$ or less.

According to the above configuration, since the zirconium composite oxide contains yttrium oxide in a high content of 55 by mass or more, sintering can be inhibited even through exposure to a high temperature. In addition, since the zirconium composite oxide contains cerium oxide, sintering can be inhibited even through exposure to a high temperature.

In addition, since the specific surface area after heating at 1250° C. for 10 hours is 3.0 $m^2/g$ or more, it can be said that the zirconium composite oxide has a high specific surface area even if it is exposed to a higher temperature exceeding 1200° C.

As described above, according to the above configuration, since the zirconium composite oxide contains yttrium oxide in a high content of 5% by mass or more, contains cerium oxide having a sintering inhibition effect, and has a specific surface area after heating at 1250° C. for 10 hours of 3.0 $m^2/g$ or more, the zirconium composite oxide can maintain a high specific surface area even through exposure to a higher temperature exceeding 1200° C.

The compositions of Patent Document 1 to 4 described above are disclosed to have a specific surface area after exposure to 1100° C. at a certain level or more, and to have a specific surface area after exposure to 1200° C. at a certain level or more. However, the compositions of Patent Document 1 to 4 cannot achieve a specific surface area after heating at 1250° C. for 10 hours of 3.0 $m^2/g$ or more.

In the configuration described above, the content of the yttrium oxide is preferably 40% by mass or less.

When the content of the yttrium oxide is 40% by mass or less, the zirconium composite oxide can suitably contain cerium oxide and zirconium oxide in amounts necessary as an oxygen storage and release material.

In the above configuration, the content of the cerium oxide is preferably 5% by mass or more and 50% by mass or less.

When the content of the cerium oxide is 5% by mass or more and 50% by mass or less, a higher sintering inhibition effect can be obtained.

In the above configuration, the zirconium composite oxide preferably contains oxides of one or more elements selected from among rare earth elements other than cerium and yttrium.

When the oxides of one or more elements selected from among rare earth elements other than cerium and yttrium are contained, a higher sintering inhibition effect can be obtained.

In the above configuration, the oxides are preferably one or more oxides selected from the group consisting of lanthanum oxide, neodymium oxide, and praseodymium oxide.

When the oxide is one or more oxides selected from the group consisting of lanthanum oxide, neodymium oxide, and praseodymium oxide, a higher sintering inhibition effect can be obtained.

In the above configuration, the content of the lanthanum oxide is preferably 1% by mass or more and 30% by mass or less.

When the content of the lanthanum oxide is 1% by mass or more and 30% by mass or less, a higher sintering inhibition effect can be obtained.

In the above configuration, the content of the neodymium oxide is preferably 1% by mass or more and 30% by mass or less.

When the content of the neodymium oxide is 1% by mass or more and 30% by mass or less, a higher sintering inhibition effect can be obtained.

In the above configuration, the content of the praseodymium oxide is preferably 1% by mass or more and 30% by mass or less.

When the content of praseodymium oxide is 1% by mass or more and 30% by mass or less, a higher sintering inhibition effect can be obtained.

In the above configuration, the zirconium composite oxide preferably contains stabilized zirconia containing 20 mol % or more and 30 mol % or less of yttrium oxide.

Stabilized zirconia has the highest melting point when the yttrium oxide content is 23 mole. Therefore, when stabilized zirconia containing 20 to 30 mol % or more of yttrium oxide and having a high melting point is contained, a higher sintering inhibition effect can be obtained.

In the above configuration, the zirconium composite oxide preferably has a specific surface area after heating at 1200° C. for 10 hours of 12.0 $m^2/g$ or more and 40.0 $m^2/g$ or less.

When the specific surface area after heating at 1200° C. for 10 hours is 12.0 $m^2/g$ or more, the zirconium composite oxide can maintain a high specific surface area even through exposure to 1200° C.

In the above configuration, the zirconium composite oxide preferably has a pore volume of 0.4 ml/g or more and 1.0 ml/g or less.

When the pore volume is 0.4 ml/g or more and 1.0 ml/g or less, the zirconium composite oxide has a relatively high pore volume in a state before being exposed to a high temperature. Since the zirconium composite oxide has a relatively high pore volume in a state before being exposed to a high temperature, the pore volume after exposure to a high temperature can be further increased. Since the pore volume after exposure to a high temperature can be further increased, the specific surface area after exposure to a high temperature can be further increased.

In the above configuration, the zirconium composite oxide is preferably an oxygen storage material of an exhaust gas purification catalyst.

When the zirconium composite oxide is an oxygen storage material of an exhaust gas purification catalyst, the zirconium composite oxide has a high sintering inhibition effect, so that deterioration of exhaust gas purification performance can be inhibited.

The method for producing a zirconium composite oxide according to the present invention is characterized in that the method comprises:

- a first step of obtaining a composite hydroxide containing Zr and Y in an amount of 20 mol % or more and 30 mol % or less in terms of oxide;
- a second step of mixing a mixed solution of a sulfating agent and a zirconium salt solution with the composite hydroxide to obtain a basic zirconium sulfate-containing reaction solution; and
- a third step of adding a salt solution or compound of cerium to the basic zirconium sulfate-containing reaction solution.

According to the above configuration, a basic zirconium sulfate-containing reaction solution is obtained by mixing a mixed solution of a sulfating agent and a zirconium salt solution with the composite hydroxide. Therefore, in the basic zirconium sulfate-containing reaction solution obtained, pores are formed through the formation of zirconium sulfate, and the composite hydroxide is to be highly dispersed in the zirconium sulfate.

The composite hydroxide is turned into stabilized zirconia (hereinafter, also referred to as "YSZ") through calcination. Since the composite hydroxide contains much yttrium, the zirconium composite oxide finally obtained will be in a state where stabilized zirconia having a high melting point is highly dispersed. As a result, the zirconium composite oxide finally obtained is to obtain a high sintering inhibition effect.

In addition, since a salt solution or compound of cerium is added to the basic zirconium sulfate-containing reaction solution, the zirconium composite oxide finally obtained is to contain cerium oxide having a sintering inhibition effect. As a result, the zirconium composite oxide finally obtained is to obtain a higher sintering inhibition effect.

In the above configuration, the third step preferably further includes a step of adding a salt solution or compound of one or more metals selected from among rare earth elements other than cerium and yttrium to the basic zirconium sulfate-containing reaction solution.

When the third step includes a step of adding a salt solution or compound of one or more metals selected from among rare earth elements other than cerium and yttrium to the basic zirconium sulfate-containing reaction solution, the zirconium composite oxide finally obtained is to further contain an oxide of a rare earth element other than cerium and yttrium having a sintering inhibition effect. As a result, the zirconium composite oxide finally obtained is to obtain a higher sintering inhibition effect.

Effect of the Invention

According to the present invention, it is possible to provide a zirconium composite oxide capable of maintaining a high specific surface area even when exposed to a higher temperature exceeding 1200° C. The present invention can provide a method for producing the zirconium composite oxide.

MODE FOR CARRYING OUT THE INVENTION

Hereinafter, embodiments of the present invention will be described. However, the present invention is not limited only to these embodiments. In the present description, zirconia is a common zirconia and contains 10% by mass or less of impurity metal compounds including hafnia.

[Zirconium Composite Oxide]

The zirconium composite oxide according to the present embodiment will be described in detail later, but the zirconium composite oxide contains zirconia as an essential component, and is a composite oxide with an oxide other than zirconia (other metal oxide). The application of the zirconium composite oxide according to the present embodiment is not particularly limited, but the zirconium composite oxide is useful as an oxygen storage material of an exhaust gas purification catalyst. When the zirconium composite oxide is used as an oxygen storage material of an exhaust gas purification catalyst, examples of the catalyst which can be supported on the oxygen storage material include a noble metal catalyst.

<Specific Surface Area>

[1. Specific Surface Area after Heating at 1250° C. For 10 Hours]

The zirconium composite oxide has a specific surface area after heating at 1250° C. for 10 hours of 3.0 $m^2/g$ or more and 20.0 $m^2/g$ or less. Since the specific surface area after heating at 1250° C. for 10 hours is 3.0 $m^2/g$ or more, it can be said that the zirconium composite oxide has a high specific surface area even if it is exposed to a higher temperature exceeding 1200° C.

The specific surface area after heating at 1250° C. for 10 hours is preferably 4 $m^2/g$ or more, more preferably 5 $m^2/g$ or more, still more preferably 6 $m^2/g$ or more, and particularly preferably 8 $m^2/g$ or more.

The specific surface area after heating at 1250° C. for 10 hours is preferably as large as possible, and is, for example, 18 $m^2/g$ or less, 15 $m^2/g$ or less, 14 $m^2/g$ or less, or the like.

[2. Specific Surface Area after Heating at 1200° C. For 10 Hours]

The zirconium composite oxide preferably has a specific surface area after heating at 1200° C. for 10 hours of 12.0 $m^2/g$ or more and 40.0 $m^2/g$ or less. When the specific surface area after heating at 1200° C. for 10 hours is 12.0 $m^2/g$ or more, the zirconium composite oxide can maintain a high specific surface area even through exposure to 1200° C.

The specific surface area after heating at 1200° C. for 10 hours is preferably 12.2 $m^2/g$ or more, more preferably 12.5 $m^2/g$ or more, still more preferably 13 $m^2/g$ or more, and particularly preferably 14 $m^2/g$ or more.

The specific surface area after heating at 1200° C. for 10 hours is preferably as large as possible, and is, for example, 35 $m^2/g$ or less, 30 $m^2/g$ or less, 25 $m^2/g$ or less, 20 $m^2/g$ or less, or the like.

[3. Specific Surface Area after Heating at 1200° C. For 3 Hours]

The zirconium composite oxide preferably has a specific surface area after heating at 1200° C. for 3 hours of 14 $m^2/g$ or more and 50 $m^2/g$ or less. When the specific surface area after heating at 1200° C. for 3 hours is 14 m=/g or more, the zirconium composite oxide can be suitably used as a catalyst carrier.

The specific surface area after heating at 1200° C. for 3 hours is preferably 14.5 m/g or more, more preferably 15 $m^2/g$ or more, and still more preferably 16 $m^2/g$ or more.

The specific surface area after heating at 1200° C. for 3 hours is preferably as large as possible, and is, for example, 45 $m^2/g$ or less, 40 $m^2/g$ or less, 35 m %/g or less, or 30 $m^2/g$ or less.

[4. Specific Surface Area after Heating at 1100° C. For 3 Hours]

The zirconium composite oxide preferably has a specific surface area after heating at 1100° C. for 3 hours of 20 $m^2/g$ or more and 60 $m^2/g$ or less. When the specific surface area after heating at 1100° C. for 3 hours is 20 m/g or more, the zirconium composite oxide can be suitably used as a catalyst carrier.

The specific surface area after heating at 1100° C. for 3 hours is preferably 22 $m^2/g$ or more, more preferably 23 m/g or more, and still more preferably 24 $m^2/g$ or more.

The specific surface area after heating at 1100° C. for 3 hours is preferably as large as possible, and is, for example, 55 $m^2/g$ or less, 50 $m^2/g$ or less, 45 $m^2/g$ or less, or the like.

[5. Specific Surface Area after Heating at 1000° C. For 3 Hours]

The zirconium composite oxide preferably has a specific surface area after heating at 1000° C. for 3 hours of 30 $m^2/g$ or more and 80 $m^2/g$ or less. When the specific surface area after heating at 1000° C. for 3 hours is 30 $m^2/g$ or more, the zirconium composite oxide can be suitably used as a catalyst carrier.

The specific surface area after heating at 1000° C. for 3 hours is preferably 33 $m^2/g$ or more, more preferably 36 $m^2/g$ or more, and still more preferably 38 $m^2/g$ or more.

The specific surface area after heating at 1000° C. for 3 hours is preferably as large as possible, and is, for example, 75 $m^2/g$ or less, 70 $m^2/g$ or less, 65 m %/g or less, or the like.

[6. Initial Specific Surface Area]

The zirconium composite oxide preferably has a specific surface area (initial specific surface area) of 40 $m^2/g$ or more. When the specific surface area is 40 $m^2/g$ or more, the zirconium composite oxide can be said to have a relatively high specific surface area in a state before being exposed to a higher temperature. Since the zirconium composite oxide has a relatively high specific surface area in a state before being exposed to a high temperature, the specific surface area after being exposed to a high temperature can be further increased. Here, the specific surface area (initial specific surface area) refers to a specific surface area in a state where heat treatment or pulverization treatment or the like is not performed after the zirconium composite oxide is produced.

The specific surface area is preferably 40 $m^2/g$ or more, more preferably 45 $m^2/g$ or more, still more preferably 50 $m^2/g$ or more, particularly preferably 55 $m^2/g$ or more, and especially preferably 60 $m^2/g$ or more.

The specific surface area is preferably as large as possible, and is, for example, 110 $m^2/g$ or less, 100 $m^2/g$ or less, 90 $m^2/g$ or less, or the like.

The specific surface area after heating at 1250° C. for 10 hours, the specific surface area after heating at 1200° C. for 10 hours, the specific surface area after heating at 1200° C. for 3 hours, the specific surface area after heating at 1100° C. for 3 hours, the specific surface area after heating at 1000° C. for 3 hours, and the specific surface area (initial specific surface area) refer to values obtained by the method described in EXAMPLES.

<Pore Volume>

[1. Pore Volume after Heating at 1250° C. For 10 Hours]

The zirconium composite oxide according to the present embodiment preferably has a pore volume after heating at 1250° C. for 10 hours of 0.02 ml/g or more. When the pore volume after heating at 1250° C. for 10 hours is 0.02 ml/g or more, it can be said that shrinkage of pores is small even if the zirconium composite oxide is exposed to a high temperature. Therefore, the specific surface area after heating at 1250° C. for 10 hours can be further increased.

The pore volume after heating at 1250° C. for 10 hours is preferably 0.03 ml/g or more, more preferably 0.04 ml/g or more, still more preferably 0.05 ml/g or more, particularly preferably 0.06 ml/g, especially preferably 0.07 ml/g, and extremely preferably 0.10 ml/g.

The pore volume after heating at 1250° C. for 10 hours is preferably as large as possible, and is, for example, 0.4 ml/g or less, 0.3 ml/g or less, 0.25 ml/g or less, 0.20 ml/g or less, or the like.

[2. Initial Pore Volume]

The zirconium composite oxide according to the present embodiment preferably has a pore volume (initial pore volume) of 0.4 ml/g or more. When the pore volume is 0.4 ml/g or more, the zirconium composite oxide has a relatively high pore volume in a state before being exposed to a high temperature. Since the zirconium composite oxide has a relatively high pore volume in a state before being exposed to a high temperature, the pore volume after exposure to a high temperature can be further increased.

Since the pore volume after exposure to a high temperature can be further increased, the specific surface area after exposure to a high temperature can be further increased.

The pore volume is preferably 0.4 ml/g or more, more preferably 0.45 ml/g or more, and still more preferably 0.5 ml/g or more.

The pore volume is preferably as large as possible, and is, for example, 1.0 ml/g or less, 0.9 ml/g or less, 0.8 ml/g or less, or the like.

Details of how to determine the pore volume are based on the method described in EXAMPLES.

<Particle Diameter>

The particle diameter $D_{50}$ of the zirconium composite oxide is preferably 0.1 μm or more and 100 μm or less. The particle diameter $D_{50}$ is more preferably 0.5 μm or more and 50 μm or less.

<Composition>

The zirconium composite oxide comprises zirconia (zirconium oxide). The content of the zirconia is preferably 30% by mass or more, more preferably 35% by mass or more, still more preferably 40% by mass or more, particularly preferably 43% by mass or more, and especially preferably 45% by mass or more, based on 100% by mass of the entire zirconium composite oxide. The upper limit of the content of the zirconia is not particularly limited, but the content of the zirconia is preferably 95% by mass or less, more preferably 92, by mass or less, still more preferably 90% by mass or less, particularly preferably 85% by mass or less, especially preferably 80% by mass or less, and extremely preferably 75% by mass or less. When the content of the zirconia is 305 by mass or more and 951 by mass or less, the zirconium composite oxide can be suitably used as a catalyst carrier.

When the zirconium composite oxide contains stabilized zirconia, the content of zirconia contained in the zirconium composite oxide is the total amount of the zirconia constituting the stabilized zirconia and zirconia other than the zirconia constituting the stabilized zirconia.

The zirconium composite oxide contains yttrium oxide in an amount of 5% by mass or more and 50% by mass or less based on the entire zirconium composite oxide. Since yttrium oxide is contained in a high content of 5% by mass or more, sintering can be inhibited even through exposure to a high temperature. In addition, since the content of yttrium oxide is 50% by mass or less, the zirconium composite oxide can contain cerium oxide and zirconium oxide in amounts necessary as an oxygen storage and release material.

When the zirconium composite oxide contains stabilized zirconia, the content of the yttrium oxide contained in the zirconium composite oxide includes the yttrium oxide constituting the stabilized zirconia.

The content of the yttrium oxide is preferably 10% by mass or more, more preferably 151 by mass or more, and still more preferably 20% by mass. The content of the yttrium oxide is preferably 48% by mass or less, more preferably 45% by mass or less, particularly preferably 40% by mass or less, and especially preferably 35% by mass or less.

The zirconium composite oxide comprises cerium oxide. Since cerium oxide is contained, sintering can be inhibited even through exposure to a high temperature.

The content of the cerium oxide is preferably 5% by mass or more, and more preferably 7.5% by mass or more based on the entire zirconium composite oxide. The content of the cerium oxide is preferably 50% by mass or less, more preferably 45% by mass or less, and still more preferably 41% by mass or less based on the entire zirconium composite oxide. When the content of the cerium oxide is 5% by mass or more and 50% by mass or less, a higher sintering inhibition effect can be obtained.

The zirconium composite oxide preferably contains oxides of one or more elements selected from among rare earth elements other than cerium and yttrium. However, it is preferable that the zirconium composite oxide does not contain Pm. That is, it is more preferable that the zirconium composite oxide contains oxides of one or more elements selected from among rare earth elements other than Ce, Y, and Pm.

The rare earth elements refer to Sc, Y, La, Ce, Pr, Nd, Pm, Sm, Eu, Gd, Tb, Dy, Ho, Er, Tm, Yb, and Lu.

When the oxides of one or more elements selected from among rare earth elements other than cerium and yttrium are contained, a higher sintering inhibition effect can be obtained.

Among the rare earth elements other than cerium and yttrium, La (lanthanum), Nd (neodymium), and Pr (praseodymium) are preferable. That is, the zirconium composite oxide preferably contains one or more oxides selected from the group consisting of lanthanum oxide, neodymium oxide, and praseodymium oxide. When the zirconium composite oxide contains one or more oxides selected from the group consisting of lanthanum oxide, neodymium oxide, and praseodymium oxide, a higher sintering inhibition effect can be obtained.

The content of the oxides of one or more elements selected from among rare earth elements other than cerium and yttrium is preferably 15 by mass or more, more preferably 3% by mass or more, still more preferably 4% by mass or more, and particularly preferably 51 by mass or more based on the entire zirconium composite oxide. The content of the oxides of one or more elements selected from among rare earth elements other than cerium and yttrium is preferably 30% by mass or less, more preferably 20% by mass or less, still more preferably 15% by mass or less, and particularly preferably 10% by mass or less based on the entire zirconium composite oxide. When the content of the oxides of one or more elements selected from among rare earth elements other than cerium and yttrium is 1 by mass or more and 30% by mass or less, a higher sintering inhibition effect can be obtained.

The zirconium composite oxide may contain, in addition to zirconia and the oxides of the rare earth elements other than cerium and yttrium, oxides of one or more elements selected from the group consisting of A) oxides of one or more elements selected from the group consisting of In, Si, P, Sn, Bi, and Zn, B) transition metal oxides (excluding oxides of rare earth elements and noble metal elements), and C) alkaline earth metal oxides.

Hereinafter, the elements shown in A) to C) are referred to as "other elements". When the zirconium composite oxide contains oxides of the other elements, the content of the oxides of the other elements may be 0.1 by mass or more in terms of oxide based on 100% by mass of the entire zirconium composite oxide. The upper limit of the content of the oxides of the other elements is not particularly limited, but the content may be 20% by mass or less, 10% by mass or less, 7, by mass or less, 55 by mass or less, or the like.

Examples of the transition metal include Ti, V, Cr, Mn, Fe, Co, Ni, Cu, Nb, Mo, Ta, and W. Examples of the alkaline earth metal include Mg, Ca, Sr, and Ba.

The zirconium composite oxide may contain impurities within a range not contradicting the gist of the present invention (for example, 0.5% by mass or less). The impurities are not particularly limited, and examples thereof include a component contained in a raw material, a component mixed during a production process, and a component that cannot be removed during a production process (for example, $SO_4$).

The zirconium composite oxide preferably contains stabilized zirconia containing 20 mol % or more and 30 mol % or less of yttrium oxide. That is, when the zirconium composite oxide contains stabilized zirconia, the content of the yttrium oxide contained in the stabilized zirconia is preferably 20 mol % or more and 30 mol % or less based on the entire stabilized zirconia. Stabilized zirconia has the highest melting point when the yttrium oxide content is 23 mol %. Therefore, when stabilized zirconia containing 20 to 30 mol % or more of yttrium oxide and having a high melting point is contained, a higher sintering inhibition effect can be obtained.

The content of the yttrium oxide contained in the stabilized zirconia is more preferably 22 mol % or more, and still more preferably 24 mol % or more based on the entire stabilized zirconia.

The content of the yttrium oxide contained in the stabilized zirconia is more preferably 28 mol % or less, and still more preferably 26 mol, or less based on the entire stabilized zirconia.

Preferable composition ratios of the zirconium composite oxide include combinations not exceeding 100% in total shown as examples in the following (1) to (4).

(1) Zirconium oxide: 30% or more and 95% or less
Yttrium oxide: 5% or more and 40% or less
Cerium oxide: 5% or more and 50% or less
Oxides of rare earth elements other than yttrium oxide and cerium oxide: 0% or more and 30% or less
Oxides of other elements: 0% or more and 10% or less (2) Zirconium oxide: 35% or more and 92% or less
Yttrium oxide: 10% or more and 40% or less
Cerium oxide: 7.5% or more and 47.5% or less
Oxides of rare earth elements other than yttrium oxide and cerium oxide: 1% or more and 20% or less
Oxides of other elements: 0% or more and 5% or less (3) Zirconium oxide: 40% or more and 90% or less
Yttrium oxide: 15% or more and 37.5% or less
Cerium oxide: 10% or more and 45% or less
Oxides of rare earth elements other than yttrium oxide and cerium oxide: 2.5, or more and 15% or less
Oxides of other elements: 0% or more and 2.5% or less (4) Zirconium oxide: 43% or more and 85% or less
Yttrium oxide: 20% or more and 35% or less
Cerium oxide: 12.5% or more and 41% or less
Oxides of rare earth elements other than yttrium oxide and cerium oxide: 4% or more and 10% or less
Oxides of other elements: 0% or more and 1% or less Since the zirconium composite oxide according to the present embodiment contains yttrium oxide in a high content of 5% by mass or more and contains cerium oxide having a sintering inhibition effect, and also has a specific surface area after heating at 1250° C. for 10 hours of 3.0 $m^2/g$ or more, the zirconium composite oxide can maintain a high specific surface area even when being exposed to a higher temperature exceeding 1200° C.

[Method for Producing Zirconium Composite Oxide]

Hereinafter, one example of a method for producing a zirconium composite oxide will be described. However, the method for producing the zirconium composite oxide of the present invention is not limited to the following exemplification.

The method for producing a zirconium composite oxide according to the present invention comprises:

a first step of obtaining a composite hydroxide containing Zr and Y in an amount of 20 mol % or more and 30 mol % or less in terms of oxide;

a second step of mixing a mixed solution of a sulfating agent and a zirconium salt solution with the composite hydroxide to obtain a basic zirconium sulfate-containing reaction solution; and a third step of adding a salt solution or compound of cerium to the basic zirconium sulfate-containing reaction solution.

First Step

In the method for producing a zirconium composite oxide according to the present embodiment, first, a composite hydroxide containing Zr and 20 mol % or more and 30 mol % or less of Y in terms of oxide is obtained.

The composite hydroxide can be obtained by mixing a zirconium salt solution and an yttrium salt solution.

The zirconium salt is only required to supply zirconium ions, and for example, zirconium oxynitrate, zirconium oxychloride, and zirconium nitrate can be used. One or two or more thereof may be used. Among these, zirconium oxychloride is preferable in terms of its high productivity on an industrial scale.

A solvent for forming the zirconium salt solution may be selected according to the type of the zirconium salt. Usually, water (pure water or ion-exchanged water) is preferable.

The concentration of the zirconium salt solution is not particularly limited, but generally, 5 to 250 g (particularly, 20 to 150 g) of zirconium oxide ($ZrO_2$) is desirably contained in 1000 g of the solvent.

The yttrium salt solution is not particularly limited, and examples thereof include an yttrium chloride solution, an yttrium nitrate solution, and an yttrium acetate solution.

The solvent in the yttrium salt solution is not particularly limited, and examples thereof include water, ether, and ethanol.

The concentration of the yttrium salt solution is not particularly limited, but is preferably 10 to 20% by mass in terms of an oxide of yttrium.

When the zirconium salt solution and the yttrium salt solution are mixed, the zirconium salt solution and the yttrium salt solution are preferably prepared such that the total concentration of $ZrO_2$ and $Y_2O_3$ in terms of oxide is 5 w/v % (mass volume percent) or more and 20 w/v % (mass volume percent) or less. By adjusting the concentration to 5 w/v % or more, a long time is not required for filtration treatment to be described later. In addition, by adjusting the concentration to 20 w/v s or less, it is possible to prevent zirconium and yttrium salts from being precipitated from the solution particularly in the winter season.

When the zirconium salt solution and the yttrium salt solution are mixed, it is preferable to mix the zirconium salt solution and the yttrium salt solution such that the content of Y with respect to the total of Zr and Y contained in the resulting composite hydroxide is 20 mol % or more and 30 mol or less in terms of oxide. When the mixing is performed such that the content of Y is 20 mol % or more and 30 mol % or less in terms of oxide, it is possible to adjust the content of the yttrium oxide in the stabilized zirconia contained in the zirconium composite oxide finally obtained to 20 mol % or more and 30 mol or less.

Incidentally, after the zirconium salt solution and the yttrium salt solution are mixed, an alkali such as an aqueous NaOH solution or an aqueous $NH_3OH$ solution is added in order to obtain a hydroxide. The alkali is not limited, and for example, ammonium hydroxide, ammonium bicarbonate, sodium hydroxide, potassium hydroxide, or the like can be used. Among these, sodium hydroxide is preferable from the viewpoint of industrial cost. The amount of the alkali added is not particularly limited as long as a hydroxide can be formed as a precipitate from the mixed solution. Usually, the alkali is added such that the pH of the solution is 11 or more, and preferably 12 or more.

In the manner described above, a composite hydroxide containing Zr and Y and containing Zr and Y in an amount of 20 mol % or more and 30 mol % or less in terms of $Y_2O_3$ (hereinafter, also referred to as "YSZ precursor") is obtained. Thereafter, filtration and washing are performed.

Next, the YSZ precursor is heated to 120° C. to 180° C. and held at a pressure of $0.2\times10^5$ Pa to $1.0\times10^6$ Pa for 30 to 90 minutes to afford a YSZ precursor slurry.

The first step has been described above.

Second Step

Next, a mixed solution of a sulfating agent and a zirconium salt solution and the composite hydroxide (YSZ precursor) are mixed and heated to afford a basic zirconium sulfate-containing reaction solution (second step).

The sulfating agent is not limited as long as the sulfating agent reacts with zirconium ions to form a sulfate (that is, a sulfating reagent), and examples thereof include sodium sulfate, potassium sulfate, and ammonium sulfate. The sulfating agent may be in any form such as a powder or solution form, but a solution (particularly, an aqueous solution) is preferable. The concentration of the solution to be used can be appropriately set.

The sulfating agent is preferably added such that the weight ratio of sulfate radical ($SO_4^{2-}$) to $ZrO_2$ is 0.3 to 0.6. The free acid concentration of the mixed solution is preferably 0.2 to 2.2 N (normal). Examples of the free acid include sulfuric acid, nitric acid, and hydrochloric acid. The type of the free acid is not limited, but hydrochloric acid is preferable in terms of its high productivity on an industrial scale.

As the zirconium salt solution, the same one as the zirconium salt solution described in the section of the first step may be adopted.

When the sulfating agent and the zirconium salt solution are mixed and heated, basic zirconium sulfate is formed. That is, the mixed solution contains basic zirconium sulfate. The zirconium salt solution and the sulfating agent usually react with each other at a temperature of 65° C. or higher to form basic zirconium sulfate. In the present invention, basic zirconium sulfate is formed by adding a mixed solution of a zirconium salt solution and a sulfating agent to a YSZ precursor slurry at a temperature of 100° C. or higher in an autoclave.

The mixing ratio of the mixed solution and the composite hydroxide (YSZ precursor) is not particularly limited, but is preferably set to a ratio at which the content of the yttrium oxide contained in the zirconium composite oxide finally obtained is 5% by mass or more and 40% by mass or less.

The mixing time of the mixed solution and the composite hydroxide is preferably 10 minutes to 60 minutes. By setting the mixing time to 10 minutes to 60 minutes, it is possible to age the basic zirconium sulfate produced. The basic zirconium sulfate is not limited, and examples thereof include hydrates of compounds such as $ZrOSO_4\cdot ZrO_2$, $5ZrO_2$-$3SO_3$, and $7ZrO_2$-$3SO_3$. The basic zirconium sulfate may be one or a mixture of two or more thereof.

The mixing temperature of the mixed solution and the composite hydroxide is preferably 110° C. to 150° C.

After the mixed solution and the composite hydroxide are mixed, the mixture is usually cooled to 60° C. or lower.

The cooling is preferably performed to 50° C. or lower, and more preferably 40° C. or lower. The lower limit temperature for the cooling is not particularly limited, but is preferably about a temperature at which the reaction solution is not frozen, and examples thereof include 10° C. or higher and 20° C. or higher. The cooling rate does not need to be particularly controlled, and may be natural cooling. However, when the scale is large, it takes time to perform natural cooling, whereby the cooling may be performed using a heat exchanger or the like. In this case, the cooling rate may be appropriately set within a range of, for example, 0.1° C./min or more and 20° C./min or less.

Thus, a basic zirconium sulfate-containing reaction solution is obtained.

In the basic zirconium sulfate-containing reaction solution obtained, pores are formed through the formation of zirconium sulfate, and the composite hydroxide (YSZ precursor) is to be highly dispersed in the zirconium sulfate.

Since the composite hydroxide contains much yttrium, the zirconium composite oxide finally obtained will be in a state where stabilized zirconia having a high melting point is highly dispersed. As a result, the zirconium composite oxide finally obtained is to obtain a high sintering inhibition effect.

The second step has been described above.

Third Step

Thereafter, a salt solution or compound of cerium is added to the basic zirconium sulfate-containing reaction solution (third step). In the third step, a salt solution or compound of one or two or more metals selected from among rare earth elements (including yttrium) other than cerium may be further added.

The first step and the second step are preferably performed in an autoclave in which the temperature and the pressure are easily managed.

Next, zirconium hydroxide is formed by neutralizing the basic zirconium sulfate-containing reaction solution. Specifically, zirconium hydroxide is formed by neutralizing the basic zirconium sulfate-containing reaction solution with an alkali. The alkali is not limited, and for example, ammonium hydroxide, ammonium bicarbonate, sodium hydroxide, potassium hydroxide, or the like can be used. Among these, sodium hydroxide is preferable from the viewpoint of industrial cost.

The amount of the alkali added is not particularly limited as long as zirconium hydroxide can be formed as a precipitate from the basic zirconium sulfate-containing reaction solution. Usually, the alkali is added such that the pH of the solution is 11 or more, and preferably 12 or more.

After the neutralization reaction, the zirconium hydroxide-containing solution is preferably held at 35 to 60° C. for 1 hour or more. As a result, the precipitate formed is aged and is rendered easy to be collected by filtration.

Next, the zirconium hydroxide is collected by a solid-liquid separation method. For example, filtration, centrifugation, and decantation and the like can be used.

After the zirconium hydroxide is collected, the zirconium hydroxide is preferably washed with water to remove impurities adhering.

The zirconium hydroxide may be dried by natural drying or heat drying.

Next, the zirconium hydroxide is subjected to heat treatment (calcination) to afford a zirconium composite oxide. The heat treatment temperature is not particularly limited, but the zirconium hydroxide is preferably subjected to heat treatment at about 400 to 900° C. for about 1 to 5 hours. The heat treatment atmosphere is preferably air or an oxidizing atmosphere.

The zirconium composite oxide obtained may, as necessary, be subjected to treatment for breaking agglomeration (deagglomeration treatment) for the purpose of improving handleability.

The method for producing the zirconium composite oxide according to the present embodiment has been described above.

EXAMPLES

Hereinafter, the present invention will be described in detail with reference to Examples, but the present invention is not limited to the following Examples as long as the following descriptions do not depart from the gist of the present invention. A zirconium composite oxide obtained in each of Examples and Comparative Examples contains 1.3 to 2.5% by mass of hafnium oxide as an unavoidable impurity with respect to zirconium oxide (calculated from the following formula (X)).

([Mass of hafnium oxide]/([mass of zirconium oxide]+[mass of hafnium oxide]))×100(%) <Formula (X)>

The maximum value and the minimum value of the content of each component shown in the following Examples should be considered as a preferable minimum value and a preferable maximum value of the present invention regardless of the content of other components.

In addition, the maximum value and the minimum value of the measured values shown in the following Examples should be considered to be the preferred minimum value and maximum value of the present invention regardless of the content (composition) of each component.

Preparation of Zirconium Composite Oxide

Example 1

First Step 92 g (35 g in terms of $ZrO_2$) of zirconium oxychloride octahydrate was dissolved in ion-exchanged water and mixed with 200 g (20 g in terms of $Y_2O_3$) of an yttrium chloride solution, thereby preparing a solution such that the total concentration of $ZrO_2$ and $Y_2O_3$ in terms of oxide was 5 w/v % (mass volume percent).

To the solution prepared (the yttrium-zirconium salt mixed solution) was added 25'% by mass NaOH, affording a composite hydroxide containing Zr and Y (YSZ precursor). After filtration and washing, the YSZ precursor was heated to 150° C. in an autoclave and held at a pressure of $5\times10^5$ Pa for 60 minutes, affording a YSZ precursor slurry.

The YSZ precursor contained 23 mol % of yttrium as calculated from the charging ratio.

Second Step

Thereafter, a mixed solution prepared by mixing a zirconium salt solution ($ZrO_2$ concentration: 25 w/ve) prepared by dissolving 45 g (17 g in terms of $ZrO_2$) of zirconium oxychloride octahydrate in ion-exchanged water and 50 g of 25% by mass sodium sulfate was added dropwise to the YSZ precursor slurry at 120° C. The resulting mixture was held for 15 minutes and then cooled, affording a basic zirconium sulfate-containing reaction solution.

Third Step

Next, to the basic zirconium sulfate-containing reaction solution were added 200 g (20 g in terms of $CeO_2$) of a cerium nitrate solution, 50 g (5 g in terms of $Nd_2O_3$) of a neodymium nitrate solution, and 50 g (5 g in terms of $Pr_6O_{11}$) of a praseodymium nitrate solution. Then, 25% by mass sodium hydroxide was added until the pH reached 13 or more, thereby generating a hydroxide precipitate (a zirconium hydroxide-containing slurry).

The hydroxide precipitate obtained was filtered, and sufficiently washed with water. The resulting hydroxide was dried at 105° C. for 24 hours. The dried hydroxide was subjected to heat treatment (calcination) at 700° C. in air for 5 hours, thereby turned to an oxide. The resulting oxide was deagglomerated in a mortar, affording a zirconium composite oxide according to Example 1. In Table 1, the composition of the zirconium composite oxide calculated from the charging ratio is shown.

Examples 2 to 9

Zirconium composite oxides according to Examples 2 to 9 were obtained in the same manner as in Example 1 except that the proportions of the materials added in the first step, the second step, and the third step were adjusted to attain the composition ratio shown in Table 1. In Examples 2 and 7, a lanthanum nitrate solution was further added in the third step such that the composition ratio shown in Table 1 was attained. In Example 9, a phosphoric acid solution was further added in the third step such that the composition ratio shown in Table 1 was attained.

Comparative Example 1

182 g (70 g in terms of $ZrO_2$) of zirconium oxychloride octahydrate was dissolved in ion-exchanged water, and then the solution was adjusted with 35% hydrochloric acid and ion-exchanged water to have an acid concentration of 0.67 N and a $ZrO_2$ concentration of 4 w/vi. The resulting solution was placed in an autoclave, the pressure was adjusted to $2\times10^5$ Pa, the temperature was raised to 120° C., 1035 g of 5'% by mass sodium sulfate was added at that temperature, and the mixture was further held for 15 minutes. Following sulfation, the resulting solution was allowed to cool to room temperature (25° C.), affording a basic zirconium sulfate-containing slurry. To the basic zirconium sulfate-containing slurry, 199 g (20 g in terms of $CeO_2$) of a cerium nitrate solution, 75 g (7.5 g in terms of $Nd_2O_3$) of a neodymium nitrate solution, and 25 g (2.5 g in terms of $Pr_6O_{11}$) of a praseodymium nitrate solution were added. Next, 500 g of 25% by mass sodium hydroxide was added over 60 minutes. This neutralization generated zirconium hydroxide. Next, the resulting zirconium hydroxide-containing slurry was filtered and washed with water, and then calcined at 700° C. for 5 hours, affording an oxide.

Comparative Example 2

A zirconium composite oxide was obtained in the same manner as in Comparative Example 1 except that the proportions of the materials were adjusted to attain the composition ratio shown in Table 1. In addition, an yttrium nitrate solution was further added instead of the neodymium nitrate solution such that the composition ratio shown in Table 1 was attained.

[Measurement of Specific Surface Area Before Heating]

The specific surface area of the zirconium composite oxide of each of Examples and Comparative Examples was measured by the BET method using a specific surface area meter ("Macsorb" manufactured by Mountec). The results are shown in Table 1.

[Measurement of Specific Surface Area after Heating at 1000° C. for 3 Hours]

The zirconium composite oxide of each of Examples and Comparative Examples was heated in an air atmosphere under atmospheric pressure (0.1013 MPa) at 1000° C. for 3 hours. The specific surface area of the zirconium composite oxide after heating at 1000° C. for 3 hours was also measured in the same manner as in "Measurement of specific surface area before heat treatment". The results are shown in Table 1.

[Measurement of Specific Surface Area after Heating at 1100° C. for 3 Hours]

The zirconium composite oxide of each of Examples and Comparative Examples was heated in an air atmosphere under atmospheric pressure (0.1013 MPa) at 1100° C. for 3 hours. The specific surface area of the zirconium composite oxide after heating at 1100° C. for 3 hours was also measured in the same manner as in "Measurement of specific surface area before heat treatment". The results are shown in Table 1.

[Measurement of Specific Surface Area after Heating at 1200° C. for 3 Hours]

The zirconium composite oxide of each of Examples and Comparative Examples was heated in an air atmosphere under atmospheric pressure (0.1013 MPa) at 1200° C. for 3 hours. The specific surface area of the zirconium composite oxide after heating at 1200° C. for 3 hours was also measured in the same manner as in "Measurement of specific surface area before heat treatment". The results are shown in Table 1.

[Measurement of Specific Surface Area after Heating at 1200° C. for 10 Hours]

The zirconium composite oxide of each of Examples and Comparative Examples was heated in an air atmosphere under atmospheric pressure (0.1013 MPa) at 1200° C. for 10 hours. The specific surface area of the zirconium composite oxide after heating at 1200° C. for 10 hours was also measured in the same manner as in "Measurement of specific surface area before heat treatment". The results are shown in Table 1.

[Measurement of Specific Surface Area after Heating at 1250° C. for 10 Hours]

The zirconium composite oxide of each of Examples and Comparative Examples was heated in an air atmosphere under atmospheric pressure (0.1013 MPa) at 1250° C. for 10 hours. The specific surface area of the zirconium composite oxide after heating at 1250° C. for 10 hours was also measured in the same manner as in "Measurement of specific surface area before heat treatment". The results are shown in Table 1.

[Measurement of Pore Volume Before Heating]

The pore volume and the pore diameter were measured by the BJH method using an analyzer "Belsorp mini II (manufactured by MicrotracBEL Corp.)".

Using the pore size distribution obtained, the total pore volume was determined. The results are shown in Table 1.

[Measurement of Pore Volume after Heating at 1250° C. for 10 Hours]

The zirconium composite oxide of each of Examples and Comparative Examples was heated in an air atmosphere under atmospheric pressure (0.1013 MPa) at 1250° C. for 10 hours. The specific surface area of the zirconium composite oxide after heating at 1250° C. for 10 hours was also measured in the same manner as in "Measurement of specific surface area before heat treatment". The results are shown in Table 1.

[Measurement of Particle Diameter $D^{50}$]

0.15 g of the zirconium composite oxide (powder) of each of Examples and Comparative Examples and 40 ml of a 0.2% aqueous sodium hexametaphosphate solution were placed in a 50-ml beaker, and dispersed for 5 minutes with an ultrasonic homogenizer "Digital Sonifier 450" (manufactured by Branson). Then, the dispersed product was placed in a device (laser diffraction particle size analyzer ("SALD-2300" manufactured by Shimadzu Corporation)) and measured. The results are shown in Table 1.

TABLE 1

| | | | Comparative Example 1 | Comparative Example 2 | Example 1 | Example 2 | Example 3 | Example 4 |
|---|---|---|---|---|---|---|---|---|
| Composition | $ZrO_2$ | % by mass | 70 | 60 | 50 | 55 | 40 | 30 |
| | $CeO_2$ | % by mass | 20 | 20 | 20 | 20 | 20 | 20 |

TABLE 1-continued

| | | | | | | | | |
|---|---|---|---|---|---|---|---|---|
| | $La_2O_3$ | % by mass | — | — | — | 5 | — | — |
| | $Nd_2O_3$ | % by mass | 7.5 | 10 | 5 | — | 5 | 7.5 |
| | $Pr_6O_{11}$ | % by mass | 2.5 | — | 5 | — | 5 | 2.5 |
| | $P_2O_5$ | % by mass | — | — | — | — | — | — |
| | $Y_2O_3$ | % by mass | — | 10 | 20 | 20 | 30 | 40 |
| | $Y_2O_3$ in YSZ | mol % | — | — | 23 | 20 | 30 | 23 |
| Specific surface area | Before heating | $m^2/g$ | 69.6 | 73.7 | 75 | 78.6 | 71.7 | 67.8 |
| | 1000° C. 3 h | $m^2/g$ | 53.2 | 56.6 | 58.1 | 60.6 | 46.1 | 38.1 |
| | 1100° C. 3 h | $m^2/g$ | 26.9 | 30.5 | 40.9 | 43 | 31.5 | 26.8 |
| | 1200° C. 3 h | $m^2/g$ | 4.1 | 3.7 | 20.5 | 18 | 17.6 | 15.2 |
| | 1200° C. 10 h | $m^2/g$ | 2.5 | 2.5 | 17.1 | 12.2 | 18.6 | 14.1 |
| | 1250° C. 10 h | $m^2/g$ | 0.9 | 0.9 | 6.7 | 3.1 | 13.3 | 11.2 |
| Pore volume | Before heating | ml/g | 0.64 | 0.77 | 0.76 | 0.65 | 0.64 | 0.5 |
| | 1250° C. 10 h | ml/g | — | — | 0.07 | 0.03 | 0.16 | 0.17 |
| Particle diameter | $D_{50}$ | μm | 2.6 | 4.5 | 4.1 | 5.2 | 3.5 | 4.1 |

| | | | Example 5 | Example 6 | Example 7 | Example 8 | Example 9 |
|---|---|---|---|---|---|---|---|
| Composition | $ZrO_2$ | % by mass | 40 | 50 | 45 | 43 | 30 |
| | $CeO_2$ | % by mass | 30 | 20 | 45 | 41 | 19 |
| | $La_2O_3$ | % by mass | — | — | 5 | — | — |
| | $Nd_2O_3$ | % by mass | 5 | 5 | — | — | 7.5 |
| | $Pr_6O_{11}$ | % by mass | 5 | 5 | — | — | 2.5 |
| | $P_2O_5$ | % by mass | — | — | — | — | 1 |
| | $Y_2O_3$ | % by mass | 20 | 20 | 5 | 16 | 40 |
| | $Y_2O_3$ in YSZ | mol % | 30 | 23 | 30 | 23 | 23 |
| Specific surface area | Before heating | $m^2/g$ | 72.1 | 73.7 | 67.3 | 70.5 | 72.3 |
| | 1000° C. 3 h | $m^2/g$ | 47.6 | 48.3 | 39.2 | 47.6 | 32.2 |
| | 1100° C. 3 h | $m^2/g$ | 33.7 | 28.9 | 24.8 | 30.2 | 22.5 |
| | 1200° C. 3 h | $m^2/g$ | 20.5 | 15.2 | 14.7 | 20.6 | 14.1 |
| | 1200° C. 10 h | $m^2/g$ | 16.7 | 12.4 | 12.6 | 16.1 | 12.1 |
| | 1250° C. 10 h | $m^2/g$ | 8.3 | 8.2 | 8.7 | 8.1 | 7.8 |
| Pore volume | Before heating | ml/g | 0.58 | 0.53 | 0.53 | 0.57 | 0.45 |
| | 1250° C. 10 h | ml/g | 0.10 | 0.14 | 0.13 | — | — |
| Particle diameter | $D_{50}$ | μm | 4.2 | 1.9 | 1.9 | 5.3 | 4.3 |

The invention claimed is:

1. A zirconium composite oxide comprising:

5% by mass or more and 50% by mass or less of yttrium oxide; and cerium oxide, wherein the zirconium composite oxide has a specific surface area after heating at 1250° C. for 10 hours is 3.0 $m^2/g$ or more and 20.0 $m^2/g$ or less.

2. The zirconium composite oxide according to claim 1, wherein a content of the yttrium oxide is 40% by mass or less.

3. The zirconium composite oxide according to claim 1, wherein a content of the cerium oxide is 5% by mass or more and 50% by mass or less.

4. The zirconium composite oxide according to claim 1, comprising oxides of one or more elements selected from among rare earth elements other than cerium and yttrium.

5. The zirconium composite oxide according to claim 4, wherein the oxide is one or more oxides selected from the group consisting of lanthanum oxide, neodymium oxide, and praseodymium oxide.

6. The zirconium composite oxide according to claim 5, wherein a content of the lanthanum oxide is 1% by mass or more and 30% by mass or less.

7. The zirconium composite oxide according to claim 5, wherein a content of the neodymium oxide is 1% by mass or more and 30% by mass or less.

8. The zirconium composite oxide according to claim 5, wherein a content of the praseodymium oxide is 1% by mass or more and 30% by mass or less.

9. The zirconium composite oxide according to claim 1, comprising stabilized zirconia containing 20 mol % or more and 30 mol % or less of yttrium oxide.

10. The zirconium composite oxide according to claim 1, wherein the zirconium composite oxide has a specific surface area after heating at 1200° C. for 10 hours of 12.0 $m^2/g$ or more and 40.0 $m^2/g$ or less.

11. The zirconium composite oxide according to claim 1, wherein the zirconium composite oxide has a pore volume of 0.4 ml/g or more and 1.0 ml/g or less.

12. The zirconium composite oxide according to claim 1, which is an oxygen storage material of an exhaust gas purification catalyst.

13. A method for producing the zirconium composite oxide according to claim 1, the method comprising:

a first step of obtaining a composite hydroxide containing Zr and Y in an amount of 20 mol % or more and 30 mol % or less in terms of oxide;

a second step of mixing a mixed solution of a sulfating agent and a zirconium salt solution with the composite hydroxide to obtain a basic zirconium sulfate-containing reaction solution; and a third step of adding a salt solution or compound of cerium to the basic zirconium sulfate-containing reaction solution.

14. The method for producing a zirconium composite oxide according to claim 13, wherein the third step includes a step of adding a salt solution or compound of one or more metals selected from among rare earth elements other than cerium and yttrium to the basic zirconium sulfate-containing reaction solution.

* * * * *